G. R. McDONALD

Feb. 3, 1931. REGULATING SYSTEM Re. 17,953

Original Filed Feb. 5, 1926

Inventor:
Gordon R. McDonald;
by Alexander S. Lunt
His Attorney.

Reissued Feb. 3, 1931

Re. 17,953

UNITED STATES PATENT OFFICE

GORDON R. McDONALD, OF ERIE, PENNSYLVANIA, ASSIGNOR TO GENERAL ELECTRIC COMPANY, A CORPORATION OF NEW YORK

REGULATING SYSTEM

Original No. 1,693,307, dated November 27, 1928, Serial No. 86,329, filed February 5, 1926. Application for reissue filed February 12, 1930. Serial No. 427,917.

My invention relates to regulating systems for maintaining a predetermined division of load between a plurality of parallel machines and its object is to provide an improved system for accomplishing this result.

My invention is especially applicable to a regulating system for maintaining the load properly divided between a plurality of overcompound direct current generators connected to a common network.

My invention will be better understood from the following description taken in connection with the accompanying drawing, and its scope will be pointed out in the appended claims.

Figure 1:
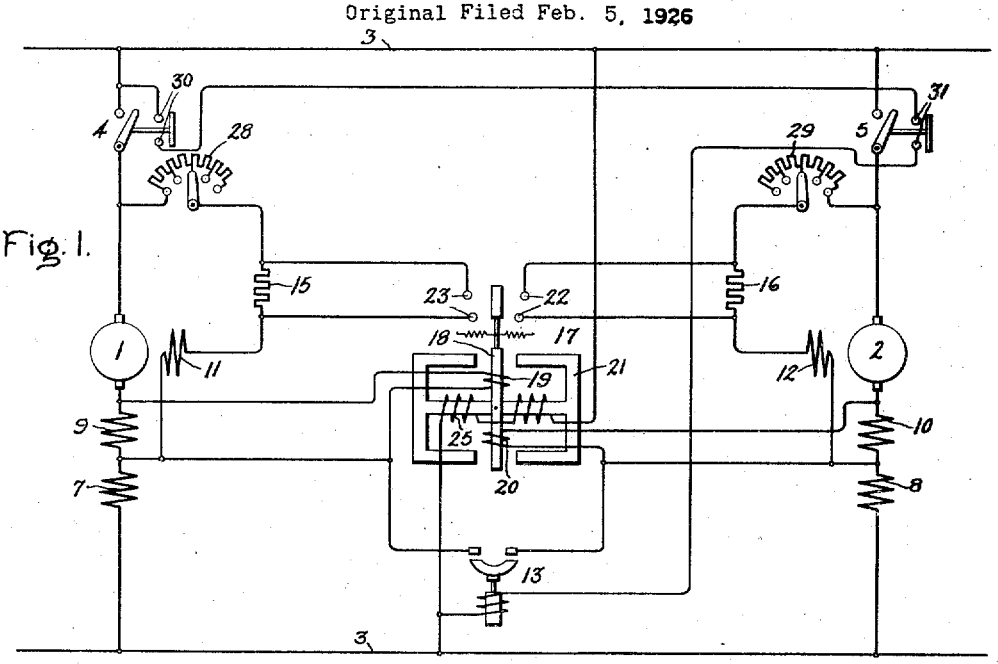
Figure 2:
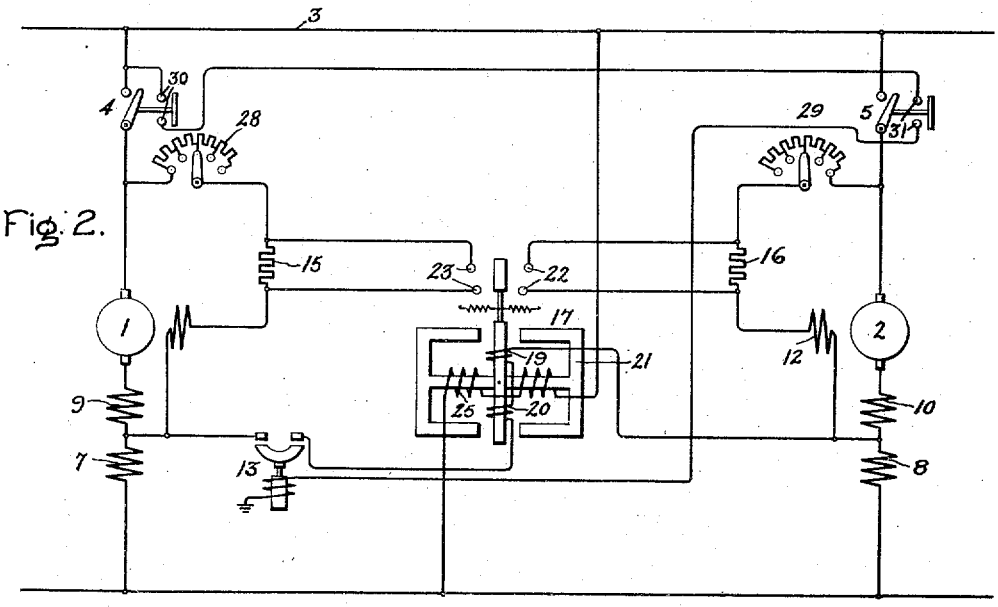

In the accompanying drawing, which shows my invention in connection with a load regulating system for two overcompound direct current generators connected in parallel, Fig. 1 shows one embodiment of my invention and Fig. 2 shows a modification of the embodiment shown in Fig. 1.

Referring to Fig. 1, 1 and 2 are two overcompound direct current generators which are respectively connected to the direct current net work 3 by suitable switching means 4 and 5. These switching means may be of any suitable type and may be controlled either manually or automatically. For example, each means may form a part of an automatic switching equipment, examples of which are well known in the art, whereby it is closed automatically after the respective generator has been started and has reached a predetermined condition.

Each generator is provided with the usual series, commutating, and shunt field windings. As shown in the drawings, 7 and 8 are the series field windings, 9 and 10 are the commutating field windings, and 11 and 12 are the shunt field windings of the generators 1 and 2 respectively.

13 represents any suitable switching means which, when closed, completes an equalizing connection between the two series field windings so that substantially equal currents flow through the series field windings. It is preferable in some cases to complete this connection only after both machines are connected in parallel. Therefore, I have shown the circuit of the closing coil of the switch 13 as including auxiliary contacts on the switches 4 and 5, so that the switch 13 can be closed only when both of the switches 4 and 5 are closed. It may be desirable, however, in other cases, to complete the equalizing connection before the two machines are connected in parallel and this may be done in the arrangement shown by omitting the auxiliary contacts of the switches 4 and 5 from the circuit of the closing coil of the switch 13 and providing any other suitable switching means, which may be either manually or automatically controlled, to open and close the circuit of the closing coil of the switch 13 at the proper time.

For equalizing the loads on the two generators, suitable current limiting means, shown as resistors 15 and 16, are respectively provided in the circuits of the field windings 11 and 12, and a polarized relay 17 of any suitable type, examples of which are well known in the art, is provided for selectively controlling a short circuit around each resistor in accordance with the relative current outputs of the two generators. For the purpose of this invention, a polarized relay is defined as a relay which has a movable member, the position of which depends upon the relative directions of two magnetic fields, the direction of one of the fields being substantially constant while the direction of the other field is variable.

As shown in the drawing, the polarized relay 17 comprises an armature 18 pivotally mounted within the two windings 19 and 20 which are therefore in mutual inductive relation. The mutually inductive windings 19 and 20 are wound differentially with respect to each other and are respectively connected so as to be energized in accordance with the current outputs of the generators 1 and 2. As shown in the drawing, the winding 19 is connected in parallel with the commutating winding 9 and the winding 20 is connected in parallel with the commutating winding 10. The armature 18 also is pivoted between the polar projections of a stationary magnetic member 21 so that the armature occupies different positions depending upon the direction and magnitude of the resultant magnetomotive force produced by the currents through the windings 19 and 20. The armature is biased to the position shown in the drawing so that when the ampere turns of the two windings are substantially equal neither of the resistors is short circuited. When the ampere turns of the winding 19 exceed the ampere turns of the winding 20 by a predetermined amount, the direction and amount of flux in armature 18 is such that the armature is moved to the right and connects the contacts 22 together, thereby completing a short circuit around the resistor 16. When the ampere turns of the winding 19 are less than the ampere turns of the winding 20 by a predetermined amount, the direction and amount of flux in the armature 18 is such that the armature is moved to the left and connects the contacts 23 together, thereby completing a short circuit around the resistor 15. The windings 19 and 20 are designed so that their ampere turns are substantially equal when the load is divided in the desired manner between the two machines.

The magnetic member 21 may be a permanent magnet but preferably it is magnetized by means of a magnetizing winding 25, the circuit of which is arranged to be completed across a suitable source of direct current of a definite polarity, such as the network 3. Suitable adjustable rheostats 28 and 29 may be provided in the circuits of the shunt field windings 11 and 12 respectively, whereby the voltage of the generators may be regulated. The adjustments of these rheostats may be controlled either manually or automatically in a manner well known in the art.

The operation of the system shown in Fig. 1 is as follows: When only one generator is in operation, the switch 13 is open so that the winding 25 and the current winding associated with the generator in operation are the only windings of the relay 17 that are energized. For example, if the generator 1 is the machine supplying current to the network, the current winding 19 and the winding 25 of the relay 17 are energized. The energization of the current winding 19, under such conditions, causes the relay 17 to close its contacts 22 and thereby short circuit the resistor 16 in the circuit of the field winding 12 of generator 2. Since the generator 2 is not connected to the network, the short circuiting of the resistor 16 has no effect at this time, but when the generator 2 is being started the fact that the resistor 16 is short circuited causes the machine to build up its voltage more quickly.

When the second machine is connected to the network 3 and the auxiliary contacts 30 and 31 on the circuit breakers 4 and 5 complete the circuit of the closing coil of the switch 13, the relay 17 then operates to control the division of the load between the two machines. If the current output of the generator 1 is too great relatively to the current output of the generator 2, the relay 17 closes its contacts 22, thereby increasing the excitation of the generator 2. This increase in the excitation of the generator 2 increases its current output and thereby decreases the current output of the generator 1. When the current output of the generator 2 has been increased sufficiently so that it is at the proper value relatively to the output of the generator 1, the relay 17 then operates to open its contacts 22 which remain open until the output of the generator 2 again decreases relatively to the output of the generator 1. If the current output of the generator 2 is too great relatively to the current output of the generator 1, the relay 17 closes its contacts 23 to effect an increase in the excitation of the generator 2 until desired current balance is restored when the relay 17 opens its contacts 23.

Tests have shown that by means of my improved arrangement it is possible to operate in parallel two overcompound direct current generators which have materially different volt-ampere characteristics and maintain the load divided between the two machines in the desired manner for all values of load.

It will be obvious to those skilled in the art that my invention has the inherent advantage of maintaining the desired division of current through the machines irrespectively of the temperatures thereof. When a shunt wound machine is started after it has been idle for some time, the resistance of the shunt field circuit is much less than it is after the machine has reached its normal operating temperature. Therefore, a cold shunt wound machine, when converted in parallel with a hot machine, tends to maintain a higher terminal voltage than the hot machine and consequently the cold machine tends to carry more than its share of the total load. The relay 17 operates under such conditions to control the short circuiting of the resistor in the shunt field circuit of the hot machine to maintain the voltages of the two parallel connected machines equal and keeps the desired division of current between them. If a cold machine is placed in operation at a time when the load is such that the higher voltage of the cold machine causes the current through the hot machine to reverse, the direction of the circulating current between the two machines is such that the torque produced by the reverse current through the relay current winding associated with the hot machine is in a direction to cause the relay 17 to short circuit the resistor in the field circuit of the hot machine. Therefore, under such reverse current conditions, the currents in both of the current windings 19 and 20 of the relay 17 produce torques in the same direction to cause the relay to short circuit the resistor in the field circuit of the hot machine.

While I have described the arrangement shown in this figure as controlling the outputs of two machines 1 and 2 so as to maintain a predetermined division between the outputs thereof, this arrangement is also arranged to maintain the desired relation between the current supplied to the two machines when they receive current from the load circuit. For example, assume the two machines 1 and 2 are connected to the circuit 3 and are receiving current therefrom and the current supplied to the machine 1 is greater than the current supplied to the machine 2. Under these conditions the ampere turns of the winding 19 of the polarized relay 17 exceed the ampere turns of the winding 20. Since, however, the current through these windings are in the opposite directions from what they are when the machines 1 and 2 are supplying current to the load circuit, the resultant flux produced in the armature 18 of the polarized relay 17 is also in the opposite direction. Therefore, the relay 17 operates to close its contacts 23 instead of its contacts 22. The closing of the contacts 23 effects in the manner heretofore described an increase in the excitation of the machine 1 so that the amount of current supplied to the machine 1 is decreased.

In a similar manner, if the current supplied to the machine 2 exceeds the amount of current supplied to the machine 1, the polarized relay 17 operates to close its contacts 22 and effects an increase in the excitation of the machine 2 so as to decrease the amount of current supplied thereto.

The relay 17, therefore, operates to maintain the proper division of current between the two machines whether the machines are supplying current to the load circuit or receiving current from the load circuit.

In the modification of Fig. 1 shown in Fig. 2, the two current coils 19 and 20 of the regulating relay 17 are connected in series in the equalizer connection. It will be observed that by means of such a connection the direction and magnitude of the flux in the armature 18 varies in accordance with the relative current output of the two machines in the same manner as in Fig. 1. When the generator 1 is supplying more than its share of the load, the voltage drop across the series field winding 7 is greater than the voltage drop across the field winding 8. Therefore, current flows through the equalizer connections and the current coils 19 and 20 from the field winding 7 to the field winding 8. The direction of the current through the current coils 19 and 20 under these conditions is such as to cause the relay 17 to close its contacts 22, thereby effecting an increase in the current output of the generator 2 to restore the proper division of the load between the two generators. When the generator 2 is supplying more than its share of the load, the voltage drop across the series field winding 7 is less than the voltage drop across the series field winding 8. Consequently, current flows through the equalizer connection and the current coils 19 and 20 in the opposite direction so that the relay 17 closes its contacts 23, thereby effecting an increase in the current output of the generator 1 to restore the proper division of the load between the two generators. The arrangement shown in Fig. 2 is also arranged to maintain the proper division between the currents through the machines 1 and 2 when they receive current from the load circuit 3. For example, if the current supplied to the machine 1 exceeds the current supplied to the machine 2 the polarized relay 17 operates to close its contacts 23 instead of its contacts 22 since the voltage drop across the winding 7, while greater than the voltage drop across the winding 8, is in the opposite direction from what it is when the machine 1 is supplying the greater current to the load circuit. Consequently, the current through the windings 19 and 20 of the relay 17 is also in the opposite direction so that the flux produced in the armature of the polarized relay 17 is in a direction to cause the relay to close its contacts 23. The closing of the contacts effects an increase in the excitation of the machine 1. In a similar manner the relay 17 operates to close its contacts 22 to effect an increase in the excitation of the machine 2 when the current supplied to the machine 2 exceeds the amount supplied to the machine 1.

While I have in accordance with the patent statutes shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is,—

1. In a regulating system, two direct current generators connected in parallel, a field circuit for each generator, current limiting means in each field circuit, and a polarized relay connected and arranged so that when the current output of one of said generators is too great relatively to the current output of the other generator, said polarized relay occupies a position to decrease the amount of current limiting means in the field circuit of said other generator and when the current output of said one of said generators is too small relatively to the current output of said other generator, said polarized relay occupies a position to decrease the amount of current limiting means in the field circuit of said one of said generators.

2. In a regulating system, two generators connected in parallel, and a polarized relay for controlling the excitation of one of said generators, comprising two mutually inductives differentially wound windings respectively energized in accordance with the current outputs of the two generators.

3. In a regulating system, two direct current generators connected in parallel, each generator being provided with a series connected field winding, and a polarized relay for controlling the excitation of one of said generators comprising a magnetic member and two differentially wound windings around said member respectively connected in parallel with said series connected field windings.

4. In combination, two dynamoelectric machines connected in parallel, a polarized relay arranged when in one position to effect a change in the excitation of one of said machines and when in another position to effect a change in the excitation of the other of said machines and means for producing a magnetomotive force in said relay which varies in direction and magnitude in accordance with the difference between the loads of the two machines whereby said relay is moved into one of said positions when the load on one of said machines exceeds the load on the other and is moved into the other of said positions when the load on said one of said machines is less than the load on the other.

5. In a load regulating system for two direct current generators connected in parallel, a polarized relay arranged when in one position to effect a change in the excitation of one of the generators and when in another position to effect a change in the excitation of the other generator, and means for producing a magnetomotive force in said relay which varies in direction and magnitude in accordance with the difference between the current outputs of the two generators comprising two differentially wound windings for said relay arranged so that when the ampere turns of one of said windings exceeds the ampere turns of the other winding, said relay is moved into one of said positions, and when the ampere turns of said one of said windings is less than the ampere turns of the other winding said relay is moved into the other of said positions, one of said windings being connected so that it is energized in accordance with the current output of one of said generators and the other of said windings being connected so that it is energized in accordance with the current output of the other generator.

6. In a load regulating system for two overcompound direct current generators connected in parallel, the combination of a resistor in the shunt field circuit of each generator, a polarized relay arranged when in one position to effect the short circuiting of one of said resistors and when in another position to effect the short circuiting of the other resistor, and means for producing a magnetomotive force in said relay which varies in direction and magnitude in accordance with the difference between the current outputs of the two generators, whereby said relay is moved to one of said positions when the current output of a predetermined one of said generators exceeds the current output of the other generator and is moved to the other position when the current output of said predetermined one of said generators is less than the current output of the other generator.

7. In a load regulating system for two compound direct current generators connected in parallel, the combination of a resistor in the shunt field circuit of each generator, and a polarized relay arranged when in one position to effect the short circuiting of one of said resistors and when in another position to effect the short circuiting of the other resistor, said relay having two differentially wound windings respectively connected in parallel with the series connected field windings of the two generators whereby said relay is moved to one of said positions when the current output of a predetermined one of said generators exceeds the other by a predetermined amount and said relay is moved to the other of said positions when the current output of said predetermined one of said generators is less than the other by a predetermined amount.

8. In a regulating system, two overcompound direct current generators connected in parallel, current limiting means in the field circuit of each generator, and a polarized relay controlled by the relative current outputs of the two generators for selectively short circuiting the current limiting means in the field circuit of the generator furnishing the smaller current.

9. In a load regulating system for two dynamoelectric machines operating in parallel, the combination of current limiting means in the field circuit of one of said machines, and a polarized relay for varying the amount of said current limiting means in said field circuit comprising means for producing a main magnetomotive force, a magnetic member and means for producing in said magnetic member an auxiliary magnetomotive force whose direction and magnitude vary directly with the difference between the outputs of the machines, said magnetomotive forces and said magnetic member cooperating to cause said relay to effect a decrease in the amount of current limiting means in the field circuit only when the output of the other machine exceeds the output of said one of said machines.

10. In a load regulating system for two dynamoelectric machines operating in parallel, the combination of current limiting means in the field circuit of one of said machines, and means for varying the amount of current limiting means in said field circuit comprising a polarized relay having a magnetic member and means for producing therein a magnetomotive force whose direction and magnitude vary directly with the difference between the outputs of the machines, said relay being arranged to effect a decrease in the amount of said current limiting means in said field circuit only when the output of the other machine exceeds the output of said one of said machines.

11. In a regulating system, two dynamoelectric machines connected in parallel, and means for regulating the relative currents flowing through the two machines including a polarized relay responsive to the direction and relative magnitudes of the currents flowing through the two machines for controlling the current through one of said machines.

12. In a regulating system, an electric circuit, two dynamoelectric machines connected in parallel across said circuit and a polarized relay responsive to the direction and relative magnitudes of the currents flowing through the two machines for effecting a predetermined change in the current through one of the machines when it is supplying to said circuit a greater current than the other machine is supplying and a similar change when said one of said machines is receiving from said circuit a smaller current than the other machine is receiving.

13. In a regulating system, two dynamoelectric machines connected in parallel, and a polarized relay for controlling the excitation of one of said machines to maintain a predetermined relation between the currents flowing through said machines comprising two mutually inductive differentially wound windings respectively energized in accordance with the currents flowing through the two machines.

14. In an automatic station, means for controlling the voltage of a machine connected in parallel with another machine to control the relative currents through the machines including a polarized relay having a winding energized in accordance with the magnitude and direction of the current through one of said machines, and resistance shunting means controlled thereby.

15. In combination a plurality of translating devices adapted to be connected in parallel, and means for controlling the voltage of one of said devices including a polarized relay having a winding energized in accordance with the magnitude and direction of the current through one of said devices and resistance shunting means controlled thereby.

16. Means for controlling the relative currents between translating devices connected in parallel comprising means including a polarized relay having a winding connected in series relation with one of said devices for controlling the voltage of one of said devices whereby the said voltage is equalized with that of the other device.

17. In a regulating system, a plurality of translating devices connected in parallel, and means including a polarized relay having a winding connected in series relation with one of said devices for controlling the voltage of one of said devices to control the relative currents through said devices.

18. In combination, a plurality of sources of current, means for connecting said sources in parallel, and means for controlling the relative currents through said devices when said sources are connected in parallel comprising a polarized relay having a winding energized in accordance with the magnitude and direction of the current through one of said sources for varying the excitation of one of said sources.

19. In combination with a plurality of sources of current and a field rheostat associated with each source, of means for equalizing the voltage of one of the sources with that of another source to control the relative currents through them including a polarized relay having a winding energized in accordance with the magnitude and direction of current through one of said sources and means controlled by said relay for short-circuiting a portion of the field rheostat of one of said sources whereby its excitation is increased to equalize its terminal voltage with that of the other source.

20. In an automatic station, a plurality of translating units, each unit having a shunt field circuit, means for controlling the relative currents through said units when connected in parallel including a polarized relay energized in accordance with the magnitude and direction of the current through one of said sources and means controlled thereby for varying the resistance of the shunt field circuit of one of the units to equalize its voltage with that of the other unit.

In witness whereof, I have hereunto set my hand this 7th day of February, 1930.

GORDON R. McDONALD.